Figure 3:
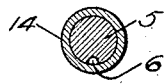

W. R. ERSKINE.
SPINDLE AND BEARING FOR SLUBBING, SPINNING, TWISTING, OR LIKE MACHINES.
APPLICATION FILED APR. 16, 1908.

966,184.

Patented Aug. 2, 1910.

Witnesses

Inventor.
William R Erskine

UNITED STATES PATENT OFFICE.

WILLIAM R. ERSKINE, OF LINDALE, GEORGIA.

SPINDLE AND BEARING FOR SLUBBING, SPINNING, TWISTING, OR LIKE MACHINES.

966,184. Specification of Letters Patent. Patented Aug. 2, 1910.

Application filed April 16, 1908. Serial No. 427,530.

*To all whom it may concern:*

Be it known that I, WILLIAM R. ERSKINE, of Lindale, in the county of Floyd and State of Georgia, have invented certain new and useful Improvements in Spindles and Bearings for Slubbing, Spinning, Twisting, or Like Machines, of which the following description, with the accompanying drawings, is a specification.

Like numerals on the drawings denote like parts.

My invention relates to slubbers and roving and fly frames, spinning-frames, twisters and like machines. Its objects are to overcome difficulties which primarily result from the collection upon rods which slide in bearings in such machines of the flyings and lint which often cloud the air that surrounds such slide-rods and which are derived chiefly from the broken ends of slubbings, rovings, or yarns, that are whipped or frayed into flyings and lint by the rapidly rotating fliers or by the rapidly running belts. The driving belts of such machines are frequently highly charged with electricity and broken ends hanging near to such belts become electrified therefrom, their end-fibers are electrically repelled from one another and they separate and fly apart into the air. Such flyings gather upon the exposed surfaces of the rods, spindles, framework, and other parts of the near by machines, and the more rapidly upon such exposed surfaces as are covered with a coating of oil. In slubbers and roving and fly frames there are usually bolster-bearings each of which surrounds and maintains in a vertical position the upper portion of a revolving spindle with a relative longitudinal traverse of the spindle and bearing. The bearing may be stationary and the spindle may traverse it longitudinally.

I have practically applied my invention to certain well-known slubbers and roving and fly frames in which the bolster-bearing which surrounds and maintains in a vertical position the upper portion of a revolving spindle has a longitudinal traverse with respect to the spindle but does not revolve and in which the spindle has only a revolving motion, and I have illustrated such application in the drawings to which this description particularly refers.

Figure 2:
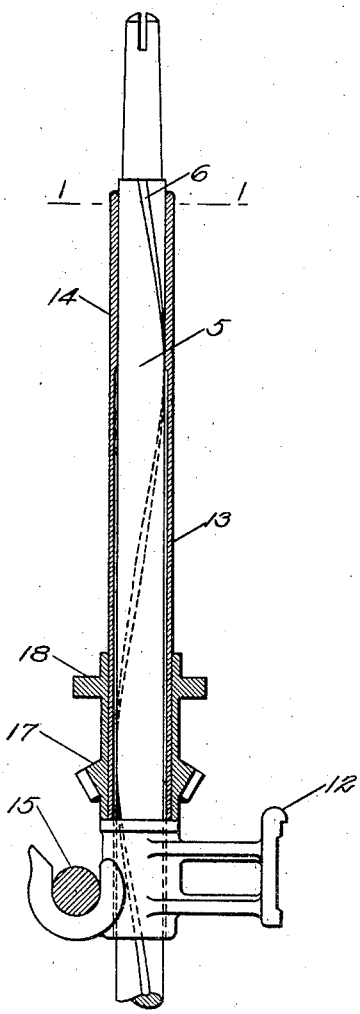
Figure 1:
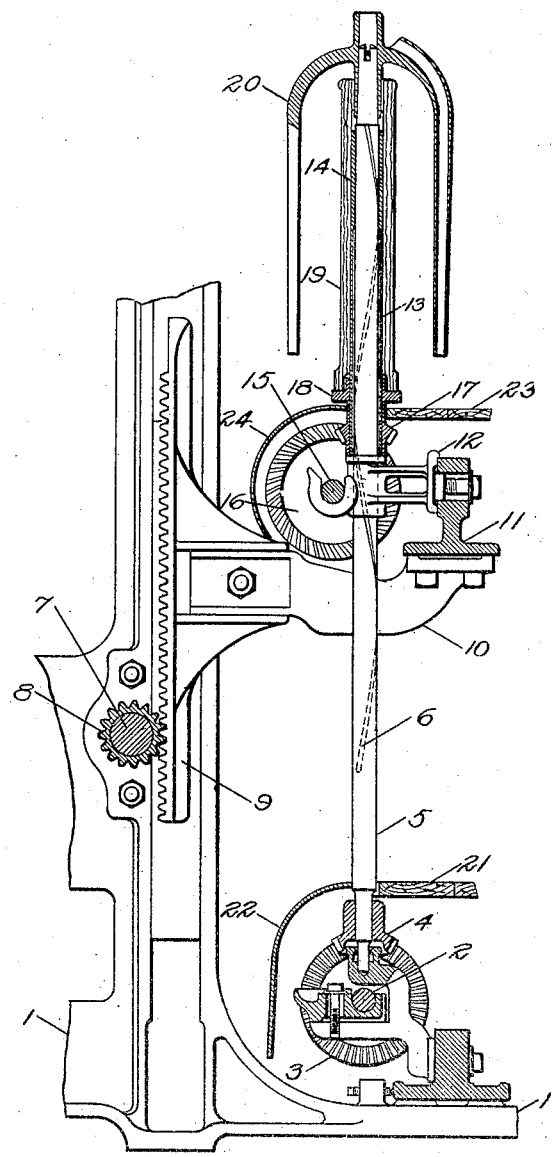

In the drawings, Figure 1, represents a vertical cross-section of so much of a fly-frame as is necessary to illustrate my invention, Fig. 2, represents a bolster-tube with related parts partly in vertical cross-section and partly in elevation and a portion of a spindle in elevation, all upon a larger scale than in Fig. 1, and Fig. 3, represents a cross-section of Fig. 2, at the line 1—1.

In the drawings: 1 represents a portion of the framing of the machine; 2, the spindle-shaft; 3, the driving bevel-gear, fastened to the spindle-shaft; 4, the driven bevel-gear fastened to the spindle; 5, the spindle; 6, the groove in the spindle; 7, the lifting-shaft; 8, the spur-gear fastened to the lifting-shaft; 9, the lifting-rack; 10, the bracket fastened to the lifting-rack and carrying the lifting-rail; 11, the lifting-rail; 12, the bolster-stand fastened to the lifting-rail; 13, the bolster-tube fastened in the bolster-stand; 14, the bolster-bearing; 15, the bobbin-shaft; 16, the driving skew-bevel-gear fastened to the bobbin-shaft; 17, the driven skew-bevel-gear which is integral with the bobbin-tube; 18, the bobbin-tube; 19, the bobbin; 20, the flier; 21, the cover-board for inclosing the spindle-driving-gearing; 22, the steel-cover for the spindle-driving-gearing; 23, the cover-board for inclosing the bobbin-rail and attached parts; 24, the steel-cover for the bobbin-driving-gearing. All of these parts are as is usual in such machines, except the spindle, which is so grooved as to embody my invention, separately and in combination with related parts. The spindles of such machines are revolving slide-rods, with respect to their bolster-bearings. Each such bearing tends to wipe the flyings from a spindle-surface, but its action as a spindle-cleaner is imperfect and some such flyings are drawn in between the spindle and the bearing. Gradually, the flyings which are thus drawn into the limited annular space between the spindle and the bearing line the bearing and become tightly packed within it. The radial dimension of this annular space is slight, although it becomes greater with wear. The more it has been enlarged by wear, the greater is the difficulty which is now being considered. If there is a flaw in the metal of the bearing, a pin-hole, a tool-mark, or other roughness, the collection of flyings forms most rapidly there and tends to throw the spindle out of its normal vertical position. The maximum deviation from the correct position of the spindle which results from this cause increases as the bolster-bearing becomes enlarged with wear. Such a collection becomes glazed by the rubbing of the spindle against it, and, when it has thickened sufficiently it causes excessive and increasing friction and heating of the parts. Sometimes such heating has given the surface of the spindles a "bluedsteel" color. Finally the sticking of the spindle within the bolster-bearing causes it to move up and down with the bolster-bearing and to cease to revolve. The friction, in the bolster-bearing, while the spindle still revolves, greatly increases the power which is required to rotate the spindles, and this increase of power is practically evidenced by the necessity of keeping the driving-belts of the machines exceptionally tight. It also tends to the injury of the bevel-gear which is secured to the spindle near its lower end, and to the injury of the cover-board which protects such gear from flyings and dust. When the spindle sticks in its bolster-bearing tightly enough to cause it to rise and fall with the bolster, which may occur without the fact having been observed, then, during its rising, one or two teeth may be broken out of the driven skew-bevel-gear which is secured to the spindle near its lower end, through the action of the teeth of its driver, the skew-bevel-gear that is secured to the horizontal-spindle shaft.

When a spindle continues its upward movement, the driven bevel-gear that is secured to it contacts with and tilts upwardly the cover-board which is close above it. When the gear has risen sufficiently far, the cover-board falls back into place but with the gear above it. As the bolster, the sticking spindle, and its attached bevel-gear make the downward traverse, the gear jams into and injures or destroys the cover-board. If experience in the mill with a particular bearing shows that such an accumulation of fibers forms within it much more rapidly than in other bearings of the same set, that particular bearing is quite likely to be smashed by order of the overseer and a new one substituted therefor. Sometimes a large number of spindles in a slubber or roving or fly-frame may all together stick in the manner that has been described, tightly enough to break the teeth out of the gear through which power is transmitted to the two horizonal shafts carrying the bevel-gears that drive the bevel-gears secured to the lower end of the spindles and to the bobbin-gears. Whenever spindles thus stick, the drawing-rolls continue to pay out roving all of which becomes flyings or waste. Such are difficulties which it is the purpose of this invention to overcome. I overcome these difficulties by cutting a groove in the spindle and I have experimented with spindles that have been variously grooved for the purpose of ascertaining what features of such grooves were of practical importance. I prefer to use a helical groove but that form is not essential to my invention. As the results of my experiments and experience I have determined that better results are secured: if the direction of the winding of the groove in the spindle is of the opposite hand to that of the revolution of the spindle with respect to its bolster or bearing; if the groove does not wind frequently about the spindle but is of particularly long pitch; if the top of the groove never passes relatively below the top-edge of the bolster-bearing; if the bottom of the groove never passes relatively above the bottom of the chambered part of the bolster-tube; and, if the shape of the following, that is, of the cutting edge of the groove is sharp but slightly obtuse-angled. It is not essential to my invention that each of these minor features shall be embodied in a grooved rod or spindle in order that it may embody my invention, but my experiments and experience show that my invention will be less efficient in its practical operation if any of the said features are omitted from its practical embodiment. When the direction of the winding of the groove in the spindle is the same hand as that of the revolution of the spindle with respect to its bolster or bearing, black, oily, fine-clipped fibers are discharged into the interior of the bobbin at the top of the bolster or bearing and when the bobbins are doffed much of the dirt falls out and smirches the roving. When the groove winds frequently about the spindle and is of comparatively short pitch, it is less efficient as a fiber-clipping device and needlessly efficient as a means for moving the offensive fibrous material lengthwise with respect to the bolster or bearing. This is particularly true of such fibrous material as may have packed into the enlarged part of the bolster-tube below the bolster-bearing. When the top of the groove passes relatively below the top-edge of the bolster-bearing during a portion of the relative reciprocation of the bolster-bearing and the rod or spindle, there is, during that portion of the relative reciprocation, a cessation of the cleaning action of the groove in the upper part of the bearing and a cessation of the efficient shearing or clipping action which should occur between the upper edge of the bearing and the following one of the two edges of the groove. When the bottom of the groove passes relatively above the bottom of the chambered part of the bolster-tube during a portion of the relative reciprocation of the bolster-tube and the rod or spindle, then there is a cessation, during that portion of the relative reciprocation, of opportunity for the free discharge of black, oily, clipped-fibers from the bottom of the groove. When the shape of the cross-section of the cutting-edge of the groove is too acute-angled, it will become too easily dulled. When that edge is too dull, it will work inefficiently. I have experimentally ascertained that a straight longitudinal groove will remove fibers from the interior of the bearing but will not free itself readily. The flyings pack into the straight groove and stick there, their weight being insufficient to cause them to pass downwardly and there being no other influence tending to cause them to traverse the groove in either direction, excepting the pressure with which such substances as are scraped from the interior of the bearing, are forced into the groove. Such pressure would tend to force such substances either way lengthwise of the groove, causing them to pass out of the groove either above or below the bearing. Any such substances which might be forced out of the groove above the bearing, would pass into the interior of the bore of the bobbin and when the bobbins are doffed they will tend to fall out and to smirch the roving.

The prior art contains many spindles which are grooved for purposes of lubrication. In these, the direction of winding of the groove in the spindle is right-handed when the revolution of the spindle is right-handed. They have been successfully used in the cases of spindles which revolve in their bearings but have no relative longitudinal traverse of the spindle and bolster bearing, but they are wholly unfit for use in slubbers and roving and fly-frames and in spinning and twisting machines where there is relative longitudinal traverse of the spindle and bearing on account of the soiling of the roving and yarn that would result. I prefer that for a spindle three-fourths (¾) of an inch in diameter the groove should make about one revolution in twelve (12) inches length.

When the bearing is rising and the spindle is revolving, fibers that adhere to the surface of a spindle having my improved groove are liable to be caught between the top edge of the bearing and the edge of the spiral groove and to be cut in two as by a pair of shears. A part of such a cut fiber may fall upon the top of the bearing. Another part of it may enter the groove. A collection of flyings which has begun to pack between the spindle and its bolster-bearing is elastic. The spindle at that edge of the groove which first reaches the collection of flyings ceases to rub or stroke the flyings and allows them by virtue of their elasticity, to fluff out into the groove, when the groove comes into such a position as to enable them to do so. The continued relative motion of the bearing and the spindle brings the following one of the two edges, that is the cutting edge of the groove into contact with a part of the collection of flyings and sweeps it from the interior of the bearing into the groove. The following edge of the groove is likely to cut more or less of the fibers of the collection. The shape of the cross-section of the following edge of the groove may be considerably varied. It may be an acute angle with good results, but I prefer that such shape shall be a right-angle or a somewhat obtuse angle, because such a shape can be constructed with less difficulty and expense and retained for a longer period without repair, and because I find by experience that such a shape is entirely satisfactory in practice. The action of the grooved spindle resembles that of a reamer and a broach. It transforms the flyings which have accumulated within the space between the spindle and its bolster-bearing into a soft spongy mass of very short fibers and dust that absorbs and retains a portion of the lubricant used, and incidentally, this oily mass is an excellent medium for continually recoating the interior of the bolster-bearing with a portion of the lubricant, as the spindle revolves and the bearing reciprocates. This economizes the lubricant, diminishes the necessity for its very frequent application, and reduces the power required for the rotation of the spindle and the reciprocation of the bearing by reducing the coefficient of friction nearer to the minimum value which is obtainable by the use of a continuous supply of lubricant. This lubricated and lubricating mass gradually passes downward, through the groove, and wholly out at the lower end of the bearing. The action which has just been described is continuous, and entirely prevents any accumulation which may tend to form between the spindle and its bolster-tube, from increasing to such an extent as to cause any of the difficulties which it is the purpose of my invention to overcome.

Below the bolster-bearing, the interior of the bolster-tube is of larger diameter than the bolster-bearing. Prior to my invention, the enlarged annular space in the bolster-tube below the bolster-bearing and between the spindle and the tube gradually filled with flyings which were carried around and up and down the spindle by the traverse of the bolster, often packing tightly into the space and causing the spindle to stick tightly in the tube. With my invention, the soft oily mass of short fragments of fibers and dust which is carried into such space through the groove acts as a lubricator and as a weight to lubricate and press downwardly any accumulation of fibers which may be found in such space. It works downwardly along the spindle or the interior of the tube and drops upon the coverboard below the tube. It can be removed with comparative ease from the cover-board and, prior to its removal, it does no practical harm.

Incidentally, my invention makes much easier the work of managing a room in which the machines are provided with my invention. The performance of the machines is so much better and their production is so much increased that operatives who would otherwise complain and refuse to remain in the care of such machines continue comparatively long in such employment and without complaint.

I claim:

1. In a slubbing, roving, or fly frame, or a spinning, twisting, or like machine, in combination: a bearing; and, a rod that is adapted to revolve in the bearing with relative longitudinal traverse of the rod and the bearing and having formed in the portion which is adapted to revolve and to relatively traverse within the bearing a groove adapted to clear flyings and other matters from the interior of the bearing, the direction of the winding of the groove in the rod being of the opposite hand from that of the revolution of the rod with respect to the bearing.

2. In a slubbing, roving, or fly frame, or a spinning, twisting, or like machine, in combination: a bolster; and, a spindle that is adapted to revolve in the bolster with relative longitudinal traverse of the spindle and the bolster and having formed in the portion that is adapted to revolve and to relatively traverse within the bolster a helical groove which is adapted to clear flyings and other matters from the interior of the bolster, the direction of the winding of the helical groove in the spindle being of the opposite hand from that of the revolution of the spindle with respect to the bolster.

3. In a slubbing, roving, or fly frame, or a spinning, twisting, or like machine, in combination: a bolster; and, a spindle that is adapted to revolve in the bolster with relative longitudinal traverse of the spindle and the bolster and having formed in the portion that is adapted to revolve and to relatively traverse within the bolster a groove of long pitch which is adapted to clear flyings and other matters from the interior of the bolster.

4. In a slubbing, roving, or fly frame, or a spinning, twisting, or like machine, in combination: a bolster; and, a spindle that is adapted to revolve in the bolster with relative longitudinal traverse of the spindle and the bolster and having formed in and also beyond the limits of that portion of the spindle which is adapted to revolve and to relatively traverse within the bolster between the top of the bolster-bearing and the bottom of the bolster-chamber below that bearing a groove that is adapted to clear flyings and other matters from the interior of the bolster.

5. In a slubbing, roving, or fly frame, or a spinning, twisting, or like machine, in combination: a bolster; and, a spindle that is adapted to revolve in the bolster with relative longitudinal traverse of the spindle and the bolster and having formed in and with both ends extending beyond the limits of that portion of the spindle which is adapted to revolve and to relatively traverse within the bolster between the top of the bolster-bearing and the bottom of the bolster-chamber below that bearing a groove that is adapted to clear flyings and other matters from the interior of the bolster.

6. In a slubbing, roving, or fly frame, or a spinning, twisting, or like machine, in combination: a bolster; and, a spindle that is adapted to revolve in the bolster with relative longitudinal traverse of the spindle and the bolster and having formed in and with both ends extending beyond the limits of that portion of the spindle that is adapted to revolve and to relatively traverse within the bolster between the top of the bolster-bearing and the bottom of the bolster-chamber below that bearing an helical groove of long pitch which is adapted to clear flyings and other matters from the interior of the bolster, the direction of the winding of the groove in the spindle being of the opposite hand from that of the revolution of the spindle with respect to the bolster.

In testimony whereof, I affix my signature in the presence of two witnesses.

WILLIAM R. ERSKINE.

Witnesses:
WM. WALTER,
CHAS. H. EDMONDSON.